(12) United States Patent
Wu et al.

(10) Patent No.: US 7,822,586 B2
(45) Date of Patent: Oct. 26, 2010

(54) SYSTEM AND METHOD FOR OPTIMIZING AND SIMULATING THERMAL MANAGEMENT SYSTEMS AND PREDICTIVE FLOW CONTROL

(75) Inventors: Qunwei Wu, Westford, MA (US); Joseph E. Smith, N. Andover, MA (US)

(73) Assignee: Entegris, Inc., Billerica, MA (US)

( * ) Notice: Subject to any disclaimer, the term of this patent is extended or adjusted under 35 U.S.C. 154(b) by 830 days.

(21) Appl. No.: 10/915,853

(22) Filed: Aug. 11, 2004

(65) Prior Publication Data

US 2006/0036417 A1   Feb. 16, 2006

(51) Int. Cl.
  *G06G 7/48* (2006.01)
  *G05D 9/00* (2006.01)
(52) U.S. Cl. .............................. 703/6; 703/9; 700/281
(58) Field of Classification Search ..................... 703/2, 703/3, 5, 6, 9; 700/281
  See application file for complete search history.

(56) References Cited

U.S. PATENT DOCUMENTS

| | | | | |
|---|---|---|---|---|
| 5,161,889 A * | 11/1992 | Smith et al. | .................... | 374/29 |
| 5,410,883 A * | 5/1995 | Nigawara et al. | .............. | 60/646 |
| 5,548,907 A * | 8/1996 | Gourdine | ..................... | 34/448 |
| 5,941,083 A * | 8/1999 | Sada et al. | ....................... | 62/99 |
| 6,027,760 A * | 2/2000 | Gurer et al. | ..................... | 427/8 |
| 6,422,007 B1 * | 7/2002 | Hartick | ......................... | 60/298 |
| 6,499,308 B2 * | 12/2002 | Inoue et al. | ................. | 62/228.3 |
| 6,591,620 B2 * | 7/2003 | Kikuchi et al. | ................ | 62/126 |
| 7,196,535 B2 * | 3/2007 | Fenk | .......................... | 324/765 |
| 2001/0033373 A1 * | 10/2001 | Sakai | ......................... | 356/312 |
| 2002/0026803 A1 * | 3/2002 | Inoue et al. | ................. | 62/228.3 |
| 2002/0124641 A1 * | 9/2002 | Porter et al. | ............... | 73/202.5 |
| 2003/0041801 A1 * | 3/2003 | Hehmann | .................... | 118/715 |
| 2003/0070438 A1 * | 4/2003 | Kikuchi et al. | ................. | 62/141 |
| 2003/0074164 A1 * | 4/2003 | Simmons et al. | ............... | 703/1 |
| 2003/0101938 A1 * | 6/2003 | Ronsse et al. | ............... | 118/726 |
| 2003/0192328 A1 * | 10/2003 | Kikuchi et al. | ................. | 62/141 |
| 2004/0073409 A1 * | 4/2004 | Fehn | ............................. | 703/1 |
| 2004/0083012 A1 * | 4/2004 | Miller | ......................... | 700/32 |
| 2006/0112682 A1 * | 6/2006 | Baba | .......................... | 60/320 |

OTHER PUBLICATIONS

International Search Report and Written Opinion, International Patent Application No. PCT/US2005/021976, May 21, 2007.

(Continued)

*Primary Examiner*—David Silver
(74) *Attorney, Agent, or Firm*—Sprinkle IP Law Group (57) ABSTRACT

Embodiments of the present invention include a computer program product including computer instructions that are executable to receive a set of process parameters, including fluid parameters and heat exchanger parameters, and determine a time for a dispense fluid to reach a target temperature. Additionally, the instructions can be executable to determine a set of process parameters that result in a time to reach the target temperature of below a predefined limit. According to another embodiment of the present invention, a set of computer instructions can calculate the time it takes for a dispense fluid to reach a target temperature for predictive flow control of a heating/cooling fluid.

43 Claims, 6 Drawing Sheets

OTHER PUBLICATIONS

International Preliminary Report on Patentability, International Patent Application No. PCT/US2005/021976, Jun. 14, 2007.
Supplementary European Search Report, European Patent Application No. 05761925.6, Jan. 15, 2008.
Alotaibi et al., "Controllability of Cross-Flow Heat Exchangers", International Journal of Heat and Mass Transfer, vol. 47, No. 5, pp. 913-924, Feb. 2004.
Mattsson, "On Modeling of Heat Exchangers in Modelica", Proceedings of the 9$^{th}$ European Simulation Symposium, pp. 1-7, Oct. 23, 1997.
Pfafferott, "Modelling and Transient Simulation of C02-Refrigeration Systems with Modelica", International Journal of Refrigeration, vol. 27, No. 1, pp. 42-52, Jan. 2004.
Office Action issued in EP 05 761 925.6-2224, 8 pgs, Jul. 31, 2008.

* cited by examiner

SYSTEM AND METHOD FOR OPTIMIZING AND SIMULATING THERMAL MANAGEMENT SYSTEMS AND PREDICTIVE FLOW CONTROL

TECHNICAL FIELD OF THE INVENTION

The present invention relates to thermal management systems. More particularly, embodiments of the present invention relate to systems and methods for optimizing and simulating thermal management systems. Even more particularly, embodiments of the present invention relate to systems and methods for optimizing and simulating thermal management subsystems in semiconductor manufacturing process systems.

BACKGROUND

In semiconductor manufacturing, the temperature of a dispense fluid must by highly regulated. Typically, a thermal management subsystem that is part of the overall semiconductor manufacturing system is used to heat or chill a dispense fluid to a desired temperature. Typical thermal management subsystems include a tank of the dispense fluid, a pump, a filter, a heat exchanger and a flow controller. In operation, the tank is filled with a dispense fluid. The pump creates a pressure differential to move the fluid from the tank to the heat exchanger. The dispense fluid increases or decreases in temperature as it passes through the heat exchanger. After one or passes through the heat exchanger, the dispense fluid reaches a target temperature.

One problem with thermal management subsystems is determining the components to use. Generally, a particular semiconductor manufacturing process will require that a particular fluid be dispensed at a particular temperature. The temperature of the dispense fluid is based on the temperature and volume of fluid in the tank, the heat imparted by the pump, the heat lost or gained at the filter, the heat transferred at the heat exchanger and the amount of fluid recirculated. A factor particularly important to many semiconductor manufacturers in heating or cooling a dispense fluid is the amount of time it takes for the fluid to reach the dispense temperature as reduced time will lead to greater throughput.

Generally, the tank volume, pump and filter are selected based on the amount and type of fluid being dispensed. Therefore, selection the appropriate heat exchanger and flow of cooling/heating fluid through the heat exchanger are the most significant aspects of optimizing the thermal management subsystem. Suppliers of thermal management subsystems currently set up prototypes of the subsystem in a lab and empirically determine which heat exchanger meets the customer's requirements. This is an expensive and time consuming process for the supplier. Because a larger heat exchanger can work with a larger range of process parameters, suppliers often select heat exchangers that are larger than required. This reduces the amount of time required to select a heat exchanger, but leads to selection of a heat exchanger that is larger and more expensive than needed for the thermal management subsystem. Accordingly a system is needed to better optimize and select the components of a thermal management subsystem.

SUMMARY OF THE INVENTION

Embodiments of the present invention provide a system and method of optimizing a thermal management system that eliminates, or at least substantially reduces, the shortcomings of prior art thermal management systems and methods. More particularly, one embodiment of the present invention includes a method of optimizing a thermal management system comprising receiving an initial set of process parameters for the thermal management system, determining a heat exchanger inlet temperature, determining a heat exchanger outlet temperature based on the initial set of process parameters, comparing the heat exchanger outlet temperature to a target temperature and if the heat exchanger outlet temperature has reached the target temperature, and determining an amount of time it took for a dispense fluid to reach the target temperature. On the other hand, if the heat exchanger outlet temperature has not reached the target temperature, the method can further comprise setting a tank temperature equal to the heat exchanger outlet temperature.

Another embodiment of the present invention can comprise (a) receiving an initial set of process parameters for the thermal management system; (b) determining a heat exchanger inlet temperature; (c) determining a heat exchanger outlet temperature based on the initial set of process parameters; and (d) comparing the heat exchanger outlet temperature to a target temperature. This embodiment can further comprise determining an amount of time it took for a dispense fluid to reach the target temperature if the heat exchanger outlet temperature has reached the target temperature or setting a tank temperature equal to the heat exchanger outlet temperature and repeating steps (b)-(d) if the heat exchanger outlet temperature has not reached the target temperature.

Another embodiment of the present invention can include a computer program product comprising a set of computer instructions stored a computer readable medium, wherein the set of computer instructions comprise instructions executable to receive an initial set of process parameters for the thermal management system, determine a heat exchanger inlet temperature, determine a heat exchanger outlet temperature based on the initial set of process parameters and compare the heat exchanger outlet temperature to a target temperature. If the heat exchanger outlet temperature has reached the target temperature, the instructions can be executable to determine an amount of time it took for a dispense fluid to reach the target temperature. On the other hand, if the heat exchanger outlet temperature has not reached the target temperature, the instructions can be executable to set a tank temperature equal to the heat exchanger outlet temperature.

Yet another embodiment of the present invention can include a method comprising receiving a set of process parameters that include a first flow rate for a heating/cooling fluid, determining an amount of time for a dispense fluid to reach a target temperature based on the set of process parameters, determining a second flow rate for the heating/cooling fluid, asserting a first set point corresponding to the first flow rate for a first period of time approximately equal to the amount of time for the dispense fluid to reach the target temperature and asserting a second set point corresponding to the second flow rate for a second period of time after the first period of time has elapsed.

Yet another embodiment of the present invention can comprise a computer program product comprising a set of computer instructions stored on a computer readable medium, executable by a processor, wherein the set of computer instructions further comprise instructions executable to receive a set of process parameters that can include a first flow rate for a heating/cooling fluid, determine an amount of time for a dispense fluid to reach a target temperature based on the set of process parameters, determine a second flow rate for the heating/cooling fluid, assert a first set point corresponding to the first mass flow rate for a first period of time approximately equal to the amount of time for the dispense fluid to reach the target temperature and assert a second set point corresponding to the second flow rate for a second period of time after the first period of time has elapsed.

Another embodiment of the present invention can include a computer program product comprising a set of computer instructions stored a computer readable medium, wherein the set of computer instructions comprise instructions executable to provide a graphical user interface further comprising a visual representation of a thermal management system, wherein the graphical user interface allows a user to input at least one process parameter and select an item from which at least one additional process parameters is derived, determine an initial set of process parameters based on inputs made through the graphical user interface, determine a heat exchanger outlet temperature based on the initial set of process parameters, and compare the heat exchanger outlet temperature to a target temperature. If the heat exchanger outlet temperature has reached the target temperature, determine an amount of time it took for a dispense fluid to reach the target temperature.

Embodiments of the present invention provide an advantage over prior art systems and methods by reducing the amount of time required to size a heat exchanger.

Embodiments of the present invention provide another advantage over prior art system and methods by allowing a number of process parameters to be easily and quickly calculated for a thermal management system.

Embodiments of the present invention provide another advantage over prior art systems by providing predicative flow control.

BRIEF DESCRIPTION OF THE FIGURES

A more complete understanding of the present invention and the advantages thereof may be acquired by referring to the following description, taken in conjunction with the accompanying drawings in which like reference numbers indicate like features and wherein.

DETAILED DESCRIPTION

Preferred embodiments of the invention are illustrated in the FIGURES, like numerals being used to refer to like and corresponding parts of the various drawings.

Embodiments of the present invention provide a system and method for optimizing a thermal management system. One embodiment of the present invention can include a computer program product including computer instructions that are executable to receive a set of process parameters, including fluid parameters and heat exchanger parameters, and determine a time for a dispense fluid to reach a target temperature. Additionally, the instructions can be executable to determine a set of process parameters that result in a time to reach the target temperature of below a predefined limit. According to another embodiment of the present invention, a set of computer instructions can calculate the time it takes for a dispense fluid to reach a target temperature for predictive flow control of a heating/cooling fluid.

Figure 1:
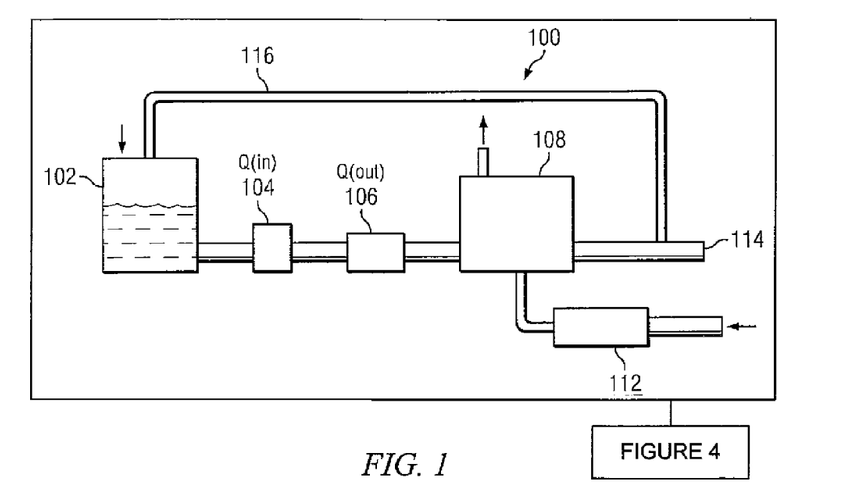
FIG. 1 is a diagrammatic representation of a thermal management system.

FIG. 1 is a diagrammatic representation of a thermal management system 100. System 100 can be a stand-alone system or a subsystem of a larger system, such as a semiconductor manufacturing system. Thermal management system 100 can include a tank 102, a pump 104, a filter 106 (e.g., an inline filter or other filter known in the art), a heat exchanger 108 and a flow controller 112. Thermal management system 100 can include additional piping to connect components, a dispense path 114 to dispense fluid to a process chamber or other process tool and a recirculation path 116 to recirculate fluid from the outlet of heat exchanger 108 to tank 102. Flow controller 112 can control the flow of a heating/cooling fluid to heat exchanger 108.

In operation, a dispense fluid can be added to the tank. The dispense fluid added to the tank will have a temperature of $T_1$. Pump 104 can move fluid from tank 102 to heat exchanger 108 with filter 106 filtering contaminants from the dispense fluid. The fluid will gain heat as it passes through pump 104 (represented by $Q_{in}$) and will lose heat (if fluid temperature is higher than environment) or gain heat (if fluid temperature is lower than environment) (represented by $Q_{out}$) as it passes through filter 106. At heat exchanger 108, heat will either be transferred to a cooling fluid or imparted from a heating fluid. The cooling heating fluid is provided to heat exchanger 108 by flow controller 112. All or a portion of the dispense fluid can then be optionally dispensed through dispense path 114 and/or recirculated to tank 102 through recirculation path 116.

Various factors affect the outlet temperature ($T_{out}$) of the heat exchanger, and hence, the dispense temperature, including, for example, the type of dispense fluid, the flow rate of the dispense fluid ($m_{disp}$), temperature of the dispense fluid in the tank, the heat added by the pump, the heat lost at the filter, the temperature of the dispense fluid entering the heat exchanger ($T_{in}$), the type of heating/cooling fluid, the input temperature ($t_{in}$) of the heating/cooling fluid, the velocity of the heating/cooling fluid ($m_{heat}$) and the type of heat exchanger selected. According to one embodiment of the present invention, a computer program (referred to as the "optimization program" for purposes of this application) can calculate the outlet temp of the heat exchanger ($T_{out}$) of the dispense fluid and determine the time it takes for $T_{out}$ to reach a predetermined target time. If the time it takes $T_{out}$ to reach the target temperature is greater than the predetermined target time, the optimization program can, according to one embodiment, selectively change the process parameters to determine a set of process parameters under which $T_{out}$ reaches the target temperature within the target time.

Figure 2A:
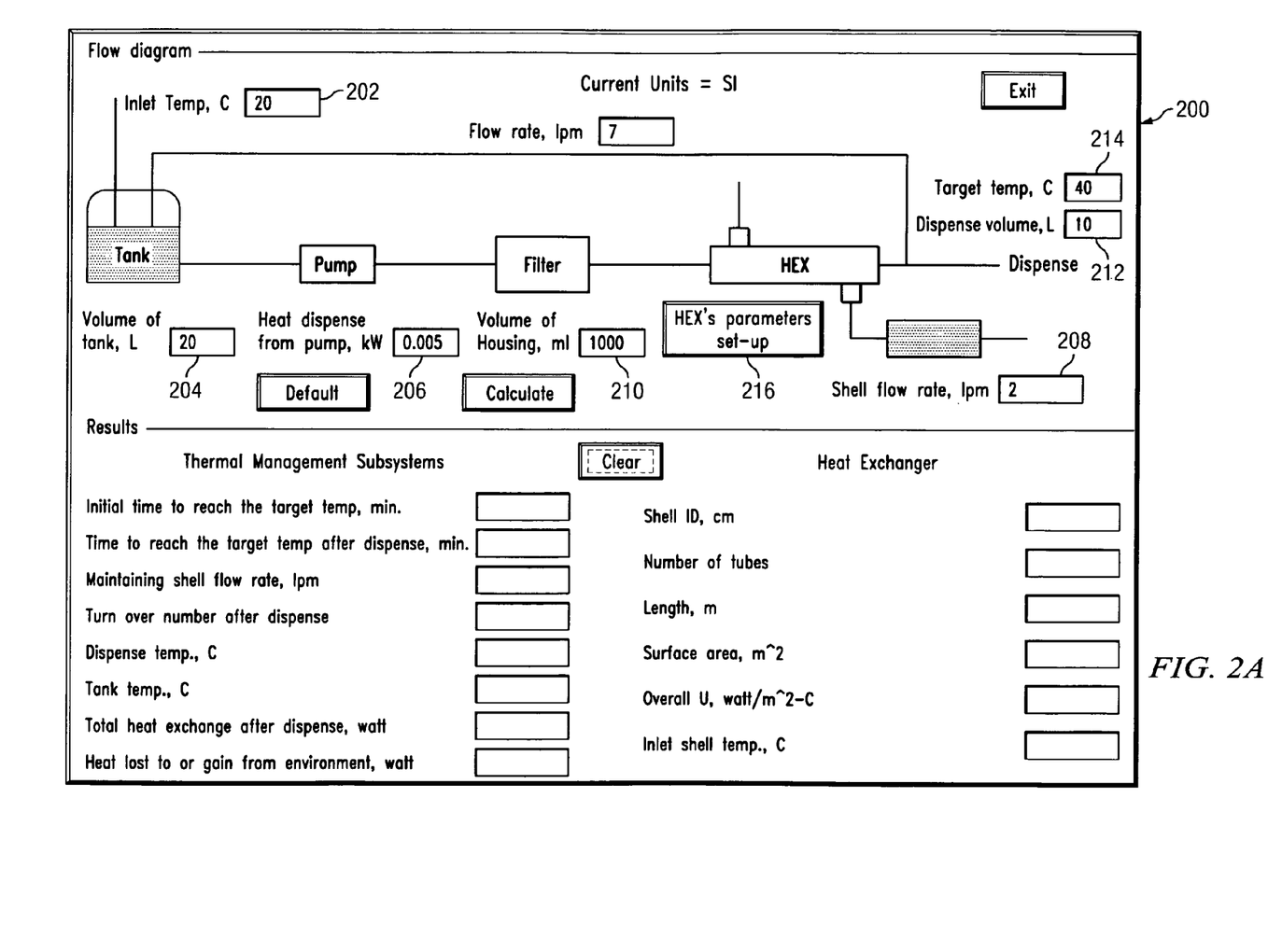
FIG. 2A is a diagrammatic representation of a screen for a user interface for representing a thermal management system according to one embodiment of the present invention.

FIG. 2A illustrates one embodiment of a screen for a graphical user interface 200 for inputting an initial set of process parameters. As shown in FIG. 2A, user interface 200 can include a visual representation of the thermal management system being modeled, including visual representations of a tank, a pump, a filter and a heat exchanger. User interface 200 can allow a user to input various process parameters. For example, a user can input the inlet temperature of the dispense fluid (inlet temperature box 202), the volume of the dispense fluid (tank volume box 204), the heat dispense from the pump (heat dispense box 206), the volume of the filter housing (filter housing volume box 208), the flow rate of the heating/cooling fluid (shell flow rate box 210), the dispense volume (dispense volume box 212) and a target temperature (target temperature box 214). Additionally, the user can access another screen in the interface to input the heat exchanger parameters (e.g., by selecting heat exchanger parameter button 216).

Figure 2B:
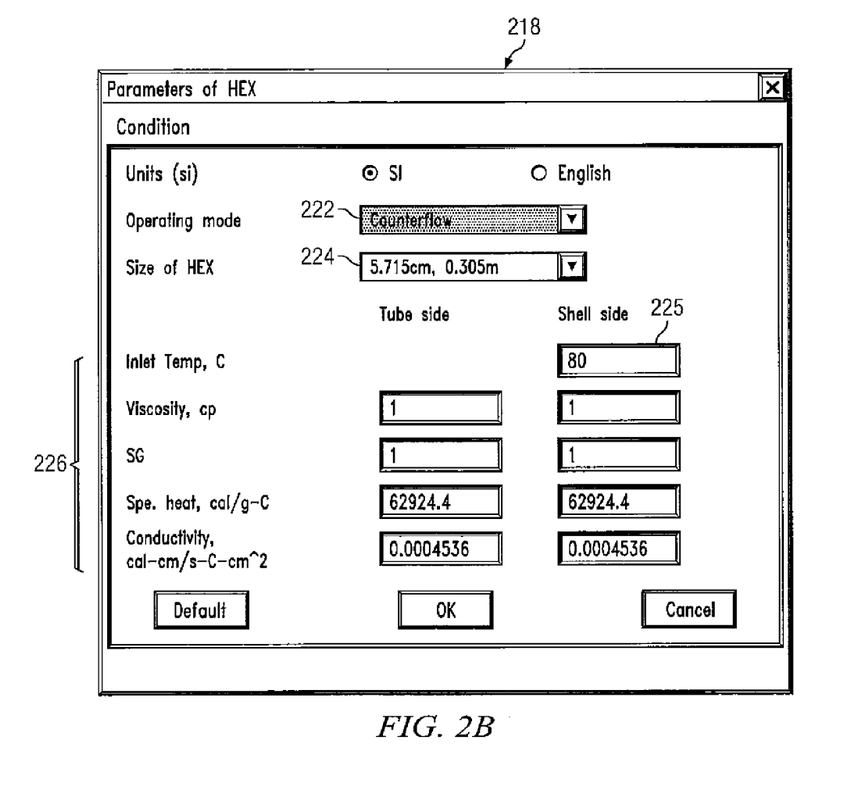
FIG. 2B is a diagrammatic representation of another screen for a user interface for specifying heat exchanger parameters according to one embodiment of the present invention.

FIG. 2B is a diagrammatic representation of one embodiment of a screen for a heat exchanger parameter interface 218 that can be accessed when a user "clicks on" heat exchanger parameter button 216. For the example of FIG. 2B, it is assumed that the heat exchanger is a shell and tube heat exchanger. However, it should be understood that other types of heat exchangers can be used. Through heat exchanger parameter interface 216, the user can specify the operating mode of the heat exchanger, such as parallel or counterflow (e.g., operating mode pull down menu 222), and the heat exchanger (heat exchanger pull down menu 224). In the example shown, the user has selected the heat exchanger with a tube diameter of 5.72 cm and a length of 0.305 meters. Based on this input, the optimization program can, for example, access a database or listing of heat exchangers to determine that the selected heat exchanger has a heat transfer surface area of 0.88 $m^2$, 680 tubes, the inside diameter of the tubes or other property associated with the selected heat exchanger. The user can also specify the inlet temperature ($t_{in}$) of the heating/cooling fluid (inlet temp box 225). Additionally, in this embodiment of heat exchanger parameter interface 218, the user in section 226 can specify various properties of the dispense fluid (tube side) and the heating cooling fluid (shell side) such as viscosity, specific gravity, specific heat and conductivity. In another embodiment of the present invention, a user can simply select a fluid and the optimization program can determine the fluid properties from a database of fluid properties.

The screens provided in FIGS. 2A and 2B are provided by way of example and other user interfaces can be implemented. Additionally, the set of parameters specified in FIGS. 2A and 2B are also provided by way of example. The user interface can allow a user to specify any set of initial process parameters that can allow the time to reach a target temperature to be calculated. For example, the user interface can give the option to specify the type and length of piping, heat gained or lost from various components, or other parameters that affect the heat transfer of the thermal management system being modeled. The optimization program can apply known heat transfer equations to the initial set of process parameters to determine how long it takes the dispense fluid to reach the target temperature.

Figure 2C:
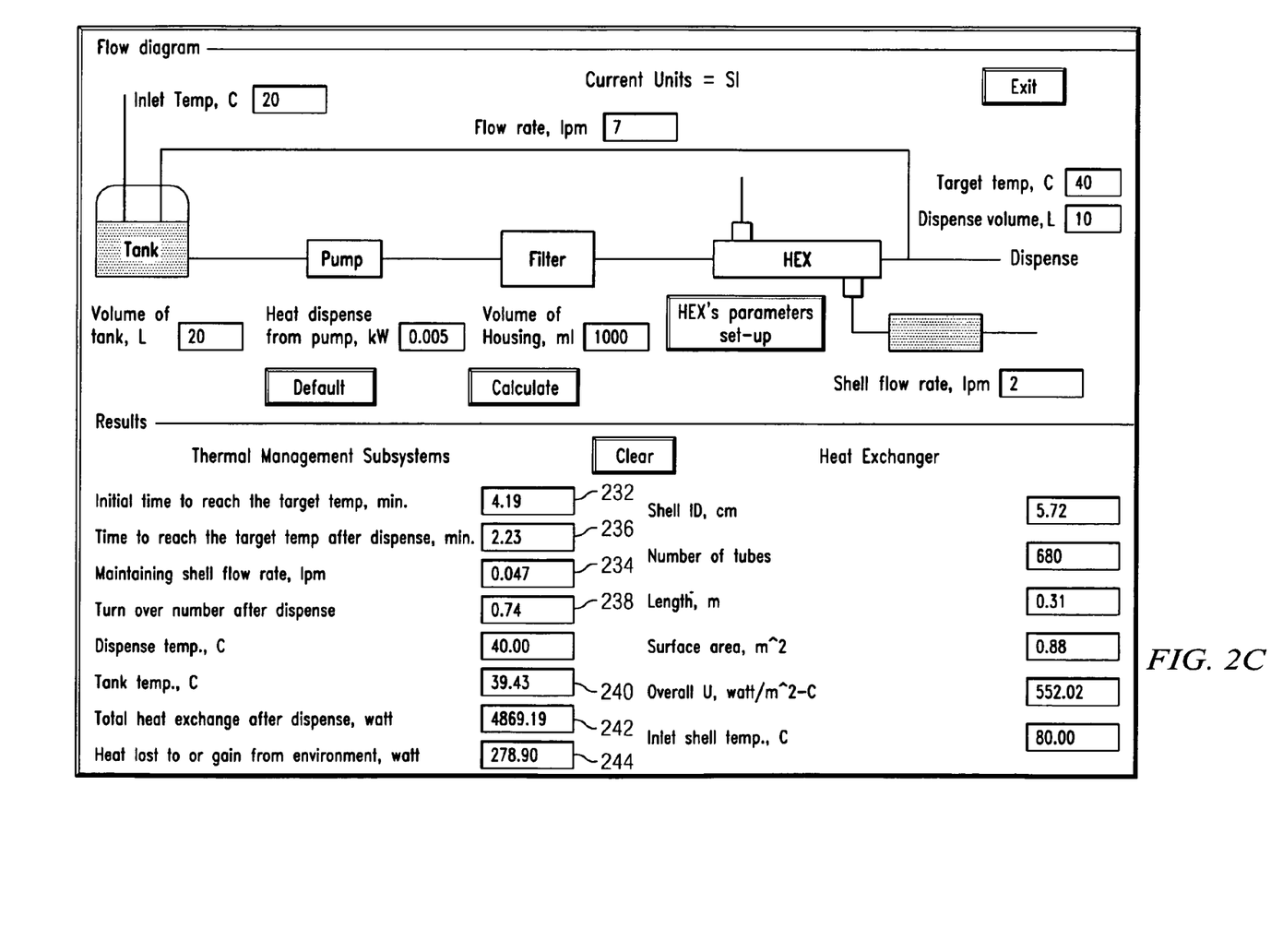
FIG. 2C is a diagrammatic representation of a screen for a user interface outputting a time to reach a target temperature.

FIG. 2C illustrates one embodiment of a user interface with a set of outputs for the process parameters indicated in the examples of FIG. 2A and FIG. 2B, according to one embodiment of the present invention. In the case of FIG. 2C, with the inputs specified, the initial time to reach the target temperature of 40 degrees Celsius is 4.19 minutes (box 232). In this case, the optimization program can account for the heat dispense from the pump and the volume of the housing. Once the dispense fluid reaches the target temperature, the target temperature can be maintained with a flow of 0.0047 lpm (box 234) through the shell of the heat exchanger. This flow compensates for heat lost to the environment for each iteration. Other factors that can be calculated include the time to reach the target temperature after a dispense (box 236), the turn over after dispense (box 238), the tank temperature (box 240), the total heat exchange after dispense (box 242) and the heat lost or gained from the environment (box 244).

Embodiments of the present invention thus provide a visual simulation of the thermal management system and allow optimization of the system through selection of various process parameters and/or devices. Process parameters or items, such as a particular heat exchanger, from which process parameters can be derived can be selected through drop down menus, boxes or other input mechanisms provided by the user interface. Thus, the user interface allows a user to input process parameters and select items from which process parameters can be derived. Additionally, the user interface provides a visual output the results of a particular simulation or optimization. It should be noted that the user interfaces illustrates in FIGS. 2A, 2B and 2C are provided by way of example only.

Figure 3:
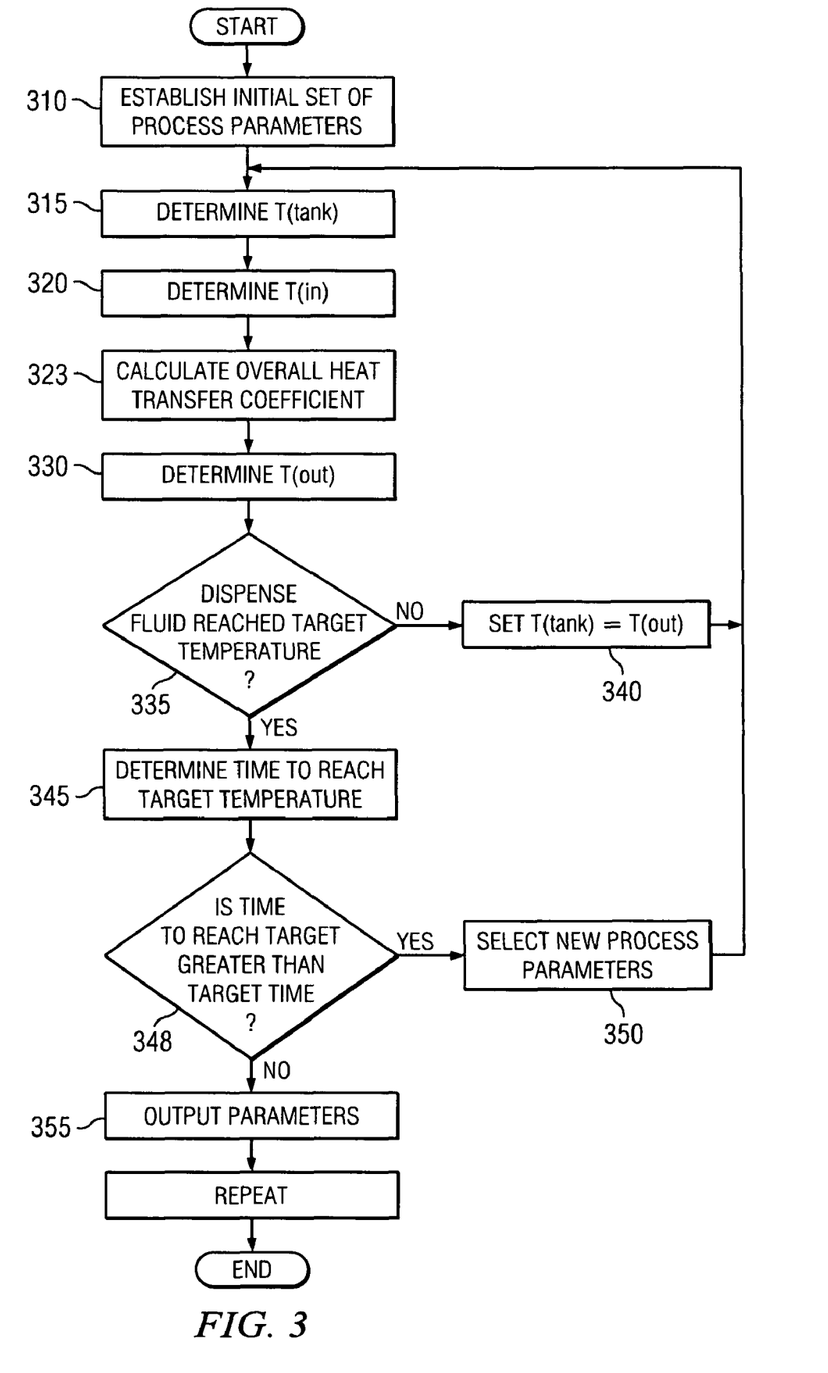
FIG. 3 is a flow chart illustrating one embodiment of optimizing a thermal management system.

FIG. 3 is a flow chart illustrating one embodiment of a method for optimizing a thermal management system. The process of FIG. 3 can be implemented as, for example, a set of computer instructions (referred to as the "optimization program" for simplicity) stored on a computer readable medium that is executable by a processor. The optimization program can be run on a computer or other computing device to model a thermal management system such as that illustrated in FIG. 1. For purposes of example, the method of FIG. 3, will be discussed in terms of optimizing the heat exchanger, but other parameters can also be optimized.

At step 310, initial process parameters for the thermal management system being modeled can be input. The initial process parameters can include any parameters used in determining the outlet temperature of the heat exchanger of the thermal management system. These can include, for example, tank parameters, pump parameters, filter parameters, dispense fluid parameters, dispense volume and the recirculation flow rate. The pump parameters can include parameters that can be used to determine the heat added to the dispense fluid as it passes through the pump. For many pumps, this may be known or known for a given flow rate. Therefore, the pump parameters may simply include, for example, the heat dispense from the pump (i.e., heat dispense to the dispense fluid). The filter parameters can include parameters to determine how much heat is lost from the filter. For an in-line filter, for example, the amount of heat lost is dependent on the volume of the filter housing. Therefore, the filter parameters may include the volume of the filter housing. Other parameters specified for the filter may include, for example, filter housing material or any other parameters related to the amount of heat lost at a filter. The flow controller parameters can include, for example, the type of heating/cooling fluid, inlet temperature of the heating/cooling fluid and flow rate of the heating/cooling fluid.

Additionally, a user can input a set of heat exchange parameters. For example, the heat exchanger parameters can include the operating mode of the heat exchanger (e.g., counterflow or parallel), the size of the heat exchanger (e.g., tube diameter and heat exchanger length) the conductivity of the dispense fluid and the heating/cooling fluid, the specific gravity of the dispense fluid and the heating/cooling fluid, the viscosity of the dispense fluid and the heating/cooling fluid. The foregoing heat exchanger parameters are provided by way of example and it should be understood that the heat exchanger parameters can include any parameters used to determine the overall heat transfer coefficient of the heat exchanger being modeled.

It should be noted that a number of the input parameters can be derived. For example, a user can be given a selection of pumps and filters from drop down menus in a graphical user interface. By selecting a particular model pump or filter, the computer instructions can determine the appropriate pump and filter parameters from a database. Similarly, a user can be given the option of selecting a particular heat exchanger. Based on the heat exchanger selected the optimization program can determine the appropriate heat exchanger parameters from a database. Example interfaces for inputting process parameters are discussed above in conjunction with FIGS. 2A and 2B.

At step 315, the mix temperature of the dispense fluid can be determined. For the first iteration, the mix temperature will be equal to the tank inlet temperature According to one embodiment of the present invention, the mix temperature for the tank ($T_{tank}$) can be equal to the tank inlet temperature (e.g., specified at inlet temperature box 202 of FIG. 2A) for the first iteration(e.g., $T_{tank}=T_1$). The optimization program, at step 320, can then determine the inlet temperature ($T_{in}$) of the dispense fluid at the heat exchanger. According to one embodiment of the present invention, the optimization program can set the inlet temperature equal to the mix temperature. According to another embodiment of the present invention, the optimization program can account for the heat lost or gained from the pump and filter when determining $T_{in}$. This can be done, for example, using known heat transfer equations, such as:

$$Q_{in} - Q_{out} = m_{disp} c_{p(disp)} (T_{in} - T_{tank}) \quad [EQN\ 1]$$

$Q_{in}$=heat in from pump;
$Q_{out}$=heat out from filter;
$m_{disp}$=mass flow rate of dispense fluid;
$c_{p(disp)}$=specific heat of dispense fluid.

It should be noted that [EQN 1] is provided by way of example, and other heat transfer equations known in the art can be used to determine Tin of the tank.

The optimization program, at step 323, can calculate the overall heat transfer coefficient of the heat exchanger according to any heat transfer method known in the art. According to one embodiment, the overall heat transfer coefficient of the heat exchanger is based on the properties and velocities of the dispense fluid and heating/cooling fluid and the properties of the heat exchanger. For example, overall heat exchanger coefficient ($U_O$) can be calculated based on:

$$U_o = \frac{1}{\frac{1}{h_{heat}} + \frac{\ln\left(\frac{r_o}{r_i}\right)}{k} + \frac{A_0}{h_{disp} A_i}} \quad [EQN\ 2]$$

where:
 $r_o$ is the outer diameter of the heat exchanger tubes
 $r_i$ is the inner diameter of the heat exchanger tubes
 $A_o$ is the outer surface area of the heat exchanger tubes
 $A_i$ is the inner area of the heat exchanger tubes
 k is the conductivity of the heat exchanger tubes
 $h_{heat}$ is the heat transfer coefficient of the heating/cooling fluid
 $h_{disp}$ is the heat transfer coefficient of the dispense fluid.

According to one embodiment of the present invention, the optimization program can determine $h_{heat}$ and $h_{disp}$ based on the dispense fluid and heating/cooling fluid properties provided by the user, such as the flow rate of the dispense fluid (e.g., the recirculation flow rate), the flow rate of the heating/cooling fluid provided by the flow controller, and the respective specific gravities, viscosities, specific heats and conductivities of the dispense fluid and heating/cooling fluid. $h_{heat}$ and $h_{disp}$ can be determined, for example, from lookup tables or can be calculated according to any methodology known in the art. Additionally, optimization program can determine $r_o$, $r_i$ $A_o$, $A_i$ and k based on the heat exchanger selected by the user. According to another embodiment of the present invention, the optimization program can assume that the heat exchanger is a thin film heat exchanger (i.e., has thin tube walls), such that the overall heat transfer coefficient is calculated according to:

$$U_o = \frac{1}{\frac{1}{h_{heat}} + \frac{1}{h_{disp}}} \quad [EQN\ 3]$$

In the examples above, $U_o$ is calculated without accounting for fouling resistance, fin resistances or multipass flow channels. The optimization program, according to other embodiments of the present invention, can calculate $U_o$ to account for fouling, fins, multipass flow paths or other factors that affect the overall heat transfer coefficient as would be understood by those of ordinary skill in the art.

Based on the overall heat transfer coefficient for the heat exchanger, the dispense fluid temperature at the inlet of the heat exchanger ($T_{in}$), the dispense fluid mass flow rate ($m_{disp}$), the specific heat of the dispense fluid ($c_{p(disp)}$), the inlet temperature of the heating/cooling fluid ($t_{in}$), the specific heat of heating/cooling fluid ($c_{p(heat)}$) and the mass flow rate of the heating/cooling fluid ($m_{heat}$) the optimization program, at step 330, can calculate the dispense fluid temperature at the outlet of the heat exchanger ($T_{out}$) according to heat transfer equations known in the art. For example, based on the following known relationships, the optimization program can determine $T_{out}$:

$$Q_{disp} = m_{disp} c_{p(disp)} (T_{in} - T_{out}) \quad [EQN\ 4]$$

$$Q_{heat} = m_{heat} c_{p(heat)} (t_{out} - t_{in}) \quad [EQN\ 5]$$

$$Q_{ex} = U_o A \Delta T_{lm} Y \quad [EQN\ 6]$$

$$\Delta T_{lm} = \frac{(T_{in} - t_{out}) - (T_{out} - t_{in})}{\ln \frac{(T_{in} - t_{out})}{(T_{out} - t_{in})}} \quad [EQN\ 7]$$

The mass flow rates of the fluids and specific heats can be determined from the fluid properties provided by the user, loaded from a database or otherwise determined. $U_o$ is the overall heat transfer coefficient. Y is a correction factor for multiple passes as can be determined based on the heat exchanger selected. EQN 4 represents the total heat transferred to/from the dispense fluid ($Q_{disp}$), EQN 5, represents the total heat transferred to/from the heating/cooling fluid ($Q_{heat}$), EQN 6 represents the total heat transferred between fluids in the heat exchanger and EQN 7 represents the log mean temperature difference used in EQN 6. According to one embodiment of the present invention, $Q_{disp}$ can approximately equal $Q_{heat}$, which can approximately equal $Q_{ex}$. The optimization program can solve for $T_{out}$ and $t_{out}$ according to EQN 4, EQN 5 and EQN 6 using numerical methods known in the art. According to another embodiment of the present invention, if $Q_{disp}$ and $Q_{heat}$ differ slightly, the heat exchanger transfer can be set equal to the mean rate of heat transfer:

$$Q_{ex} = \frac{1}{2}(Q_{disp} + Q_{heat})$$ [EQN 8]

Again, in this case, there are only two unknowns in EQN 4, EQN 5, EQN 6 and EQN 8, $T_{out}$ and $t_{out}$. Therefore, the optimization program can solve for these variables to determine the dispense fluid temperature ($T_{out}$) at the outlet of the heat exchanger. It should be noted that the equations above are provided by way of example, and any heat transfer methodology known in the art can be used to determine $T_{out}$.

The optimization program, at step 335, can determine whether the dispense fluid has reached the dispense temperature. In the case of dispense fluid cooling, the optimization program can determine if $T_{out}$ is equal to or less than the dispense temperature. For dispense fluid heating, the optimization program can determine if $T_{out}$ is equal to greater than the dispense temperature. If $T_{out}$ has not reached the dispense temperature, the optimization program can account for the iteration and return to step 315, setting $T_{tank}$ to $T_{out}$ (step 340). Setting the tank mix temperature for an iteration to $T_{out}$ from the previous iteration essentially makes the assumption that the tank is drained before fluid is replaced by the recirculation path. In this case, an iteration is however long it takes the volume of dispense fluid to cycle through the heat exchanger. For example, if the dispense fluid has a flow rate of 7 lpm and there are 20 liters of dispense fluid, an iteration takes approximately 2.86 minutes.

While, in practice, the dispense fluid recirculated from the heat exchanger may mix with dispense fluid remaining in the tank, the assumption the tank drains in each iteration greatly simplifies the calculations that the optimization program must perform as it assumes that for each iteration the temperature of the dispense fluid input into the heat exchanger is constant for that iteration. This allows the optimization program to take up less computing resources. According to other embodiments, the optimization program can continually update the input temperature at the heat exchanger to account for mixing of the recirculating fluid and the fluid in the tank.

If at step at step 335, the optimization program determines that $T_{out}$ has reached the target temperature, the optimization program, at step 345, can account for the iteration and calculate the time it takes $T_{out}$ to reach the target temperature. As an example, assume that recirculation flow rate is 7 lpm, the tank volume is 20 liters and the target temperature is 40 degrees Celsius minute. In this case, each iteration takes 2.86 minutes. If after the first iteration $T_{out}$ is 36.09 degrees Celsius, the input ($T_{in}$) for the next iteration can be 36.09 degrees Celsius (for the sake of simplicity, this assumes that the heat in and out from the pump and filter are negligible) and the output temperature $T_{out}$ can be 47.87 degrees Celsius. Since $T_{out}$ is greater than the target temperature, the time to reach the target temperature is greater than 2.86 minutes (the time for 20 liters to reach 36.09 minutes) and less than 5.72 minutes (the time for 20 liters to reach 47.87 degrees). The optimization program can determine the time to reach 40 degrees through interpolation, curve fitting or other numeric methods known in the art.

In addition to calculating the time it takes for the dispense fluid to reach the target temperature, the optimization program can calculate other process outputs. For example, the optimization program can determine the flow rate through the shell ($m_{heat}$) to maintain the target temperature. The flow rate through the shell can be calculated based on the EQN 4, 5, 6 and 7. In this case, $T_{out}$ is known (e.g., 40 degrees Celsius), so the only unknowns are $m_{heat}$ and $t_{out}$. Accordingly, the optimization program can solve for $m_{heat}$.

Additionally, the optimization program can determine how long after a dispense it takes for the dispense fluid to return to the target temperature. In this case, the optimization program can return to step 315 and calculate the mix temperature ($T_{tank}$) based on $T_{out}$ from the previous iteration and the inlet temperature ($T_1$) of the dispense fluid from the tank. The optimization program can then repeat steps 315-345 to determine how long the dispense fluid takes to reach the target temperature after a dispense. The optimization program can also determine other process parameters such as flow rate through the shell to maintain the dispense fluid at a particular temperature, the total heat exchanged after a dispense process, the total heat lost or gained from the environment.

As discussed above, FIG. 2C illustrates several outputs provided by the optimization program. In this case the optimization program displays the time to reach the target temperature. If this time is greater than a target time, a user can selectively change the process parameters until the time to reach the target temperature is below the target time. For example, the user can select a new heat exchanger, new $T_1$, new $t_{in}$, new $m_{disp}$, new $m_{heat}$ or other process parameter.

In another embodiment, the optimization program at step 348 can determine if the time to reach the target temperature is greater than the target time. If so, the optimization program can change one or more of the process parameters (step 350) until the time to reach the target temperature is below the predefined limit. For example, the optimization program can change the flow rate through the shell, the heat exchanger selected, the filter housing volume, the heat dispense from the pump, the tank temperature, the temperature of the heating/cooling fluid at the inlet of the heat exchanger or other parameter until a set of process parameters result in the time to reach the target temperature being within the target time. Generally, the optimization program does not alter the dispense fluid, dispense volume or target temperature as they are typically constant (e.g., a customer requirement) for a particular dispense process being modeled. However, according to other embodiments of the present invention, the optimization program can alter any of the process parameters. The optimization program can then output the process parameters that resulted in reaching the target temperature within the target time (step 355). The process of FIG. 3 can be arbitrarily repeated as needed or desired.

Figure 4:
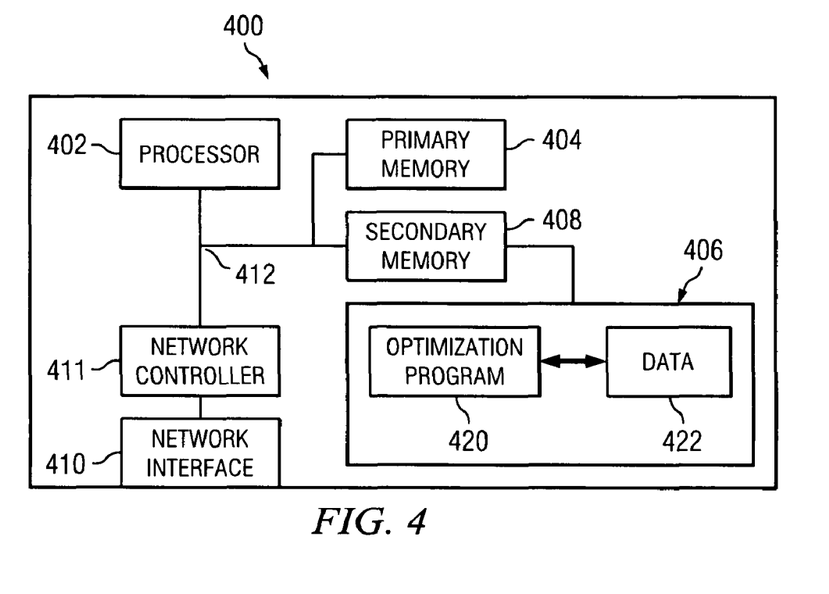
FIG. 4 is a diagrammatic representation of one embodiment of a computer system.

According to another embodiment of the present invention, the optimization program can be implemented in a computer system. FIG. 4 is one embodiment of a computer system 400 in which one embodiment of an optimization program can be implemented. Computer system 400 can include a processor 402, a primary memory 404 (e.g., RAM, ROM, Flash memory or other computer readable medium known in the art), a secondary memory 406 (optical disk, magnetic disk or other computer readable medium known in the art), a secondary memory controller 408, a network interface 410 and a network controller 411. Processor 402 can communicate with various components of computer system 400 via a bus 412. Additional components that are not illustrated include by way of example, but not limitation, I/O interfaces, additional network interfaces and controllers, input devices, output devices and other computer components known in the art. By way of example, but not limitation, computer system 400 can be a desktop personal computer or workstation used for modeling thermal management systems.

An optimization program 420 can be stored on secondary memory 406. Secondary memory controller 408 can control access to secondary memory 406. During execution, all or a portion of the optimization program may be stored in primary memory 404. Secondary memory 406 can also store a set of data 422 that is part of or accessible by the optimization program. Set of data 422 can include, for example, heat exchanger data for various heat exchangers, data related fluid properties and other data usable by optimization program 420. Optimization program 420 can be implemented as an executable Visual Basic program, a C++ program, a module of a larger program or according to any other programming scheme known to those in the art.

In the examples above, the optimization program determines the amount of time for a dispense fluid to reach a target temperature for a given set of process parameters and a set of process parameters that result in the dispense fluid reaching a target temperature within a target time. The optimization program can be run, for example, on a computer used to model thermal management systems and does not have to interact with the thermal management system. In other words the optimization program can be used to model and design a thermal management system. According to another embodiment of the present invention, a set of computer instructions (e.g., a "flow control program") can be implemented at a flow controller (e.g., flow controller 112 of FIG. 1) or device operable to assert a set point to a flow controller. The flow control program can use a determination of the amount of time for a dispense fluid to reach a target temperature, as discussed above, to determine when to reduce flow of a heating/cooling fluid.

Figure 5:
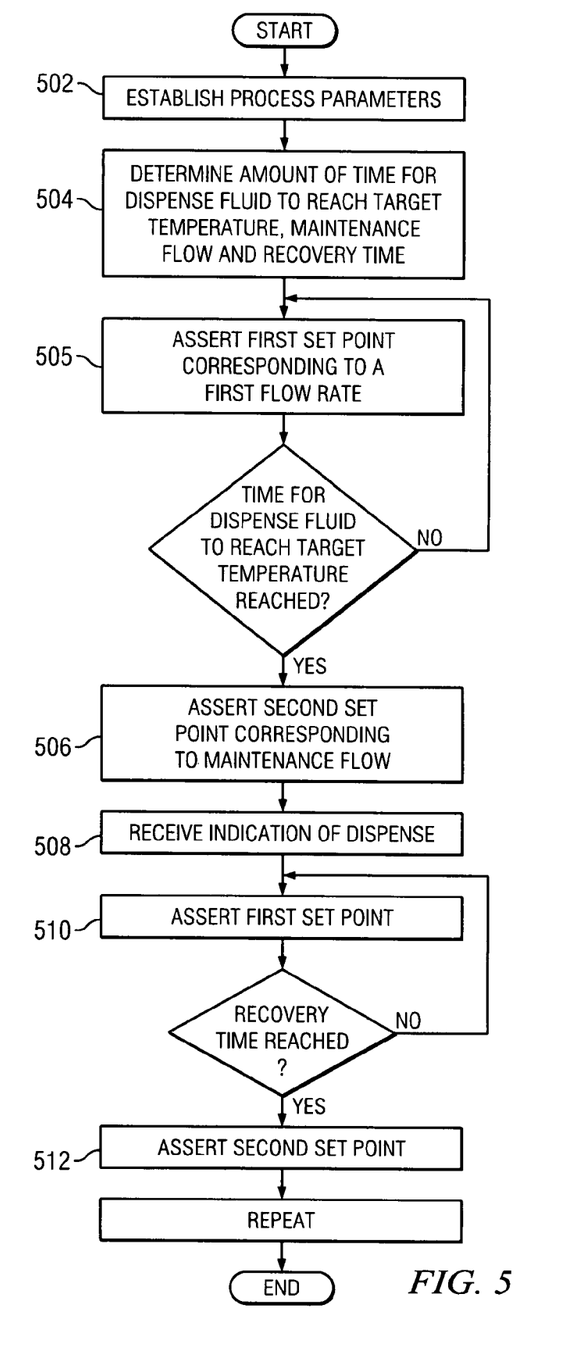
FIG. 5 is a flow chart illustrating one method of predicative flow control.

FIG. 5 is a flow chart illustrating one embodiment of a method for predictive flow control. At step 502 the flow control program can receive a set of process parameters for a thermal management system. The process parameters can be provided through a graphical user interface, as described above, loaded to memory or provided according to any manner of providing data known in the art. At step 504, the flow control program can determine the amount of time for the dispense fluid to reach the specified target temperature, the heating/cooling fluid flow rate to maintain the dispense fluid at the target temperature (e.g., the maintenance flow), and the recovery time after a dispense as described in conjunction with FIG. 3. Using the example of FIG. 2C, for the given process parameters its takes 4.19 minutes to reach the target temperature.

At step 505, the flow control program can assert a first set point based on the initial process parameters. For example, if the initial process parameters specify a flow rate of the heating cooling fluid of 2 lpm (as in FIG. 2B) the flow control program can assert a set point to the flow controller to allow a 2 lpm flow of the heating/cooling fluid for the time it takes the dispense fluid to reach the target temperature (e.g., 4.19 minutes in the example of FIG. 2C). At approximately the time determined for the dispense fluid to reach the target temperature, the flow control program can assert a second set point to the flow controller (step 506) to cause the flow controller to allow a flow of heating/cooling fluid that will maintain the dispense fluid at the target temperature (e.g., 0.0047 lpm in the case of FIG. 2C). Thus, the flow control program can assert the first set point for a first period of time approximately equal to the amount of time for the dispense fluid to reach the target temperature and assert the second flow rate for a second period of time.

At step 508 the flow control program can receive an indication that a dispense process has occurred. The flow control program at, step 510, can reassert the first set point to increase the flow of the heating/cooling fluid to heat/cool the dispense fluid to the target temperature. In the case of FIG. 2C, the first set point can correspond to a flow of 2 lpm. The flow control program can reassert the first set point for the amount of time it takes to recover from a dispense process. When the time it takes to recover from a dispense process has been reached, the flow control program, at step 512 can reassert the second set point corresponding to the flow of the heating/cooling fluid to maintain the dispense fluid at the target temperature (e.g., 0.0047 lpm in the case of FIG. 2C). Thus, the flow control program can reassert the first set point for a third period of time (e.g., approximately equal to the recovery time) and then reassert the second set point.

The flow control program, in one embodiment of the present invention, can rely on calculations of the time to reach the target temperature, maintenance flow rate and time to recover from a dispense in asserting set points to the flow controller, without requiring inputs from temperature sensors. In other words, the flow control program can act in a predictive manner to control flow through the thermal management system. According to other embodiments of the present invention, the flow control program can receive input from temperature sensors to determine the temperature of the dispense fluid at the outlet of the heat exchanger and can adjust the set point asserted based on the temperature readings. The use of a temperature sensor to determine $T_{out}$ can be used to ensure that the predicative flow control remains properly calibrated for the thermal management subsystem.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed in the following claims.

What is claimed is:

1. A method of optimizing a thermal management system comprising:

providing a system comprising a thermal management system modeling system and a heat exchanger database, the thermal management modeling system connected to the heat exchanger database via a network providing a database interface, a graphical user interface and an optimization module;

receiving a set of process parameters for a thermal management system via the graphical user interface, wherein the process parameters comprise one or more heat exchanger parameters that represent the physical and operational characteristics of the heat exchanger, one or more dispense fluid parameters and one or more heating/cooling fluid parameters;

accessing the heat exchanger database via the database interface to retrieve one or more additional heat exchanger parameters that represent the physical characteristics of the heat exchanger, wherein the one or more heat exchanger parameters comprise whether the heat exchanger is a counterflow heat exchanger and a heat exchanger size and wherein the one or more additional heat exchanger parameters comprise a number of tubes and a surface area;

calculating an inlet temperature of a dispense fluid at an inlet of a heat exchanger for the thermal management system based on the set of process parameters;

calculating an outlet temperature of the dispense fluid at an outlet of the heat exchanger for the thermal management system based on the set of process parameters;

determining whether the dispense fluid has reached a dispense temperature by comparing the outlet temperature of the dispense fluid at the outlet of the heat exchanger for the thermal management system to a target temperature;

altering one or more process parameters including one or more heat exchanger parameters that represent the physical characteristics of the heat exchanger and repeating the calculating steps utilizing the altered one or more process parameters until the dispense temperature of the dispense fluid has reached the target temperature within a specified time; and outputting through the graphical user interface optimized process parameters comprising optimized heat exchanger parameters representing physical characteristic of an optimal heat exchanger for the thermal management system, optimized dispense fluid parameters and optimized heating/cooling fluid parameters that resulted in the dispense temperature of the dispense fluid reaching the target temperature within the specified time.

2. The method of claim 1, further comprising setting a tank temperature equal to the outlet temperature of the dispense fluid at the outlet of the heat exchanger for the thermal management system.

3. The method of claim 1, further comprising:
comparing the amount of time for the temperature of the dispense fluid to reach the target temperature to a target time; and
selecting a new set of process parameters to change the time for the temperature of the dispense fluid to equal a target time.

4. The method of claim 1, wherein selecting a new set of process parameters comprises selecting a new set of heat exchanger parameters.

5. The method of claim 1, wherein the set of process parameters comprises:
a set of heat exchanger parameters;
a set of dispense fluid parameters;
a set of heating/cooling fluid parameters; and
the target temperature.

6. The method of claim 5, wherein the set of process parameters further comprises:
a dispense fluid flow rate; and
a heating/cooling fluid flow rate.

7. The method of claim 5, wherein the set of process parameters further comprises:
pump parameters; and
filter parameters.

8. The method of claim 1, further comprising determining a maintenance flow rate.

9. The method of claim 1, further comprising determining a recovery time after a dispense.

10. The method of claim 1, wherein the graphical user interface comprises a visual representation of the thermal management subsystem being modeled.

11. The method of claim 10, wherein the visual representation further comprises:
a representation of a tank;
a representation of a pump;
a representation of a filter; and
a representation of a heat exchanger.

12. The method of claim 11, further comprising selecting at least one item from which at least one process parameter is derived using the graphical user interface.

13. The method of claim 11, inputting at least one process parameter using the graphical user interface.

14. A method of optimizing a thermal management system comprising:
(a) receiving at and optimization computer a set of process parameters for a model of a thermal management system based on inputs at a graphical user interface, wherein the process parameters comprise one or more heat exchanger parameters that represent the physical and operational characteristics of the heat exchanger, one or more dispense fluid parameters and one or more heating/cooling fluid parameters;
(b) interface with a database to retrieve a set of additional heat exchanger parameters that represent physical characteristics of the heat exchanger, wherein the one or more heat exchanger parameters comprise whether the heat exchanger is a counterflow heat exchanger and a heat exchanger size and wherein the set of additional heat exchanger parameters comprise a number of tubes and a surface area;
(c) determining, at the optimization computer, an inlet temperature of a dispense fluid at an inlet of a heat exchanger for the thermal management system based on the set of process parameters and additional heat exchanger parameters;
(d) determining, at the optimization computer, an outlet temperature of the dispense fluid at an outlet of the heat exchanger for the thermal management system based on the set of process parameters and additional heat exchanger parameters; and
(e) altering one or more process parameters including at least one parameter representing a physical characteristic of the heat exchanger and repeating steps (b) and (c) until the dispense fluid reaches a target temperature for dispensing within a specified time; and
outputting through the graphical user interface the one or more process parameters including the at least one parameter representing the physical characteristic of the heat exchanger that resulted in the dispense fluid reaching the target temperature within the specified time.

15. The method of claim 14, further comprising:
(f) comparing the amount of time for the temperature of the dispense fluid to reach the target temperature to a target time; and
(g) selecting a new set of process parameters to change the time for the temperature of the dispense fluid to equal a target time.

16. The method of claim 14, wherein selecting a new set of process parameters comprises selecting a new set of heat exchanger parameters.

17. The method of claim 14, wherein the set of process parameters comprises:
a set of heat exchanger parameters;
a set of dispense fluid parameters;
a set of heating/cooling fluid parameters; and
the target temperature.

18. The method of claim 17, wherein the set of process parameters further comprises:
a dispense fluid flow rate; and
a heating/cooling fluid flow rate.

19. The method of claim 18, wherein the set of process parameters further comprises:
pump parameters; and
filter parameters.

20. The method of claim 14, further comprising determining a maintenance flow rate.

21. The method of claim 14, further comprising determining a recovery time after a dispense.

22. The method of claim 14, wherein the user interface comprises a visual representation of the thermal management subsystem being modeled.

23. The method of claim 22, wherein the visual representation further comprises:
a representation of a tank;
a representation of a pump;
a representation of a filter; and
a representation of a heat exchanger.

24. The method of claim 23, further comprising selecting at least one item from which at least one process parameter is derived using the user interface.

25. The method of claim 24, further comprising inputting at least one process parameter using the user interface.

26. A computer program product comprising a computer readable storage medium storing a set of computer instructions, wherein the set of computer instructions comprise instructions executable to:
a) receive set of process parameters for a model of a thermal management system through a graphical user interface code, wherein the process parameters comprise one or more heat exchanger parameters that represent the physical and operational characteristics of the heat exchanger, one or more dispense fluid parameters and one or more heating/cooling fluid parameters;
b) interface with a database to retrieve a set of additional heat exchanger parameters that represent physical characteristics of the heat exchanger through database interface code, wherein the one or more heat exchanger parameters comprise whether the heat exchanger is a counterflow heat exchanger and a heat exchanger size and wherein the set of additional heat exchanger parameters comprise a number of tubes and a surface area;
c) determine using the optimization code an inlet temperature of a dispense fluid at an inlet of a heat exchanger for the thermal management system from the set of process parameters and additional heat exchanger parameters received from the graphical user interface code and database interface code;
d) determine an outlet temperature of the dispense fluid at an outlet of the heat exchanger for the thermal management system based on the set of process parameters and additional heat exchanger parameters using the optimization code;
e) compare the outlet temperature of the dispense fluid at the outlet of the heat exchanger for the thermal management system to a target temperature using the optimization code;
f) determine an amount of time for the temperature of the dispense fluid to reach the target temperature using the optimization code;
alter one or more process parameters including at least one parameter representing a physical characteristic of the heat exchanger to affect the amount of time for the temperature of the dispense fluid to reach the target temperature; and
repeat steps c)-f) utilizing the altered one or more process parameters until the amount of time equals a target time.

27. The computer program of claim 26, further comprising instructions executable to:
set a tank temperature equal to the heat exchanger outlet temperature.

28. The computer program product of claim 26, further comprising instructions executable to:
compare the amount of time for the temperature of the dispense fluid to reach the target temperature to the target time; and
select a new set of process parameters to change the time for the temperature of the dispense fluid to equal a target time.

29. The computer program product of claim 26, wherein selecting a new set of process parameters comprises selecting a new set of heat exchanger parameters.

30. The computer program product of claim 26, wherein the set of process parameters comprises:
a set of heat exchanger parameters;
a set of dispense fluid parameters;
a set of heating/cooling fluid parameters; and
the target temperature.

31. The computer program product of claim 30, wherein the set of process parameters further comprises:
a dispense fluid flow rate; and
a heating/cooling fluid flow rate.

32. The computer program product of claim 30, wherein the set of process parameters further comprises:
pump parameters; and
filter parameters.

33. The computer program product of claim 26, further comprising instructions executable to a maintenance flow rate.

34. The computer program product of claim 26, further comprising instructions executable to determine a recovery time after a dispense.

35. A computer program product comprising a computer readable storage medium storing a set of computer instructions, wherein the set of computer instructions comprise instructions executable to:
provide a system comprising graphical user interface code, optimization code and database interface code;
provide a graphical user interface using the graphical user interface code, the graphical user interface further comprising a visual representation of a thermal management system, wherein the graphical user interface allows a user to input at least one process parameter for the thermal management system and select an item from which at least one additional process parameters is derived, wherein the at least one process parameter comprises at least one heat exchanger parameter representing a physical characteristic of a heat exchanger and at least one heat exchanger parameter representing an operation characteristic of the heat exchanger;
determine a set of additional heat exchanger parameters using the database interface code that represent additional physical characteristics of the heat exchanger, wherein the one or more heat exchanger parameters comprise whether the heat exchanger is a counterflow heat exchanger and a heat exchanger size and wherein the set of additional heat exchanger parameters comprise a number of tubes and a surface area;
determine a heat exchanger inlet temperature for a dispense fluid based on the at least one process parameter and the set of additional heat exchanger parameters using the optimization code;
determine a heat exchanger outlet temperature for the dispense fluid based on the at least one process parameter and the set of additional heat exchanger parameters using the optimization code; and
compare the heat exchanger outlet temperature to a target temperature using the optimization code; and provide optimized heat exchanger parameters for a recommended heat exchanger to a user using the graphical user interface code.

36. The computer program product of claim 35, further comprising instructions executable to output the amount of time it took for a dispense fluid to reach the target temperature in the graphical user interface.

37. The computer program of claim 35, further comprising instructions executable to:
set a tank temperature equal to the heat exchanger outlet temperature.

38. The computer program product of claim 35, further comprising instructions executable to:
compare the amount of time for the temperature of the dispense fluid to reach the target temperature to a target time; and
select a new set of process parameters to change the time for the temperature of the dispense fluid to equal a target time.

39. The computer program product of claim 35, wherein the graphical user interface allows a user to specify:
a set of dispense fluid parameters;
a set of heating/cooling fluid parameters; and
the target temperature.

40. The computer program product of claim 39, wherein the graphical user interface allows a user to specify:
a dispense fluid flow rate; and
a heating/cooling fluid flow rate.

41. The computer program product of claim 39, wherein the graphical user interface allows a user to specify:
at least one pump parameter; and
at least one filter parameter.

42. The computer program product of claim 35, further comprising instructions executable to determine a maintenance flow rate and output the maintenance flow rate in the graphical user interface.

43. The computer program product of claim 35, further comprising instructions executable to determine a recovery time after a dispense and output the recovery time in a graphical user interface.

* * * * *